March 23, 1943.  W. L. CARLSON  2,314,687
BATTERY CHARGING SYSTEM
Filed June 8, 1942
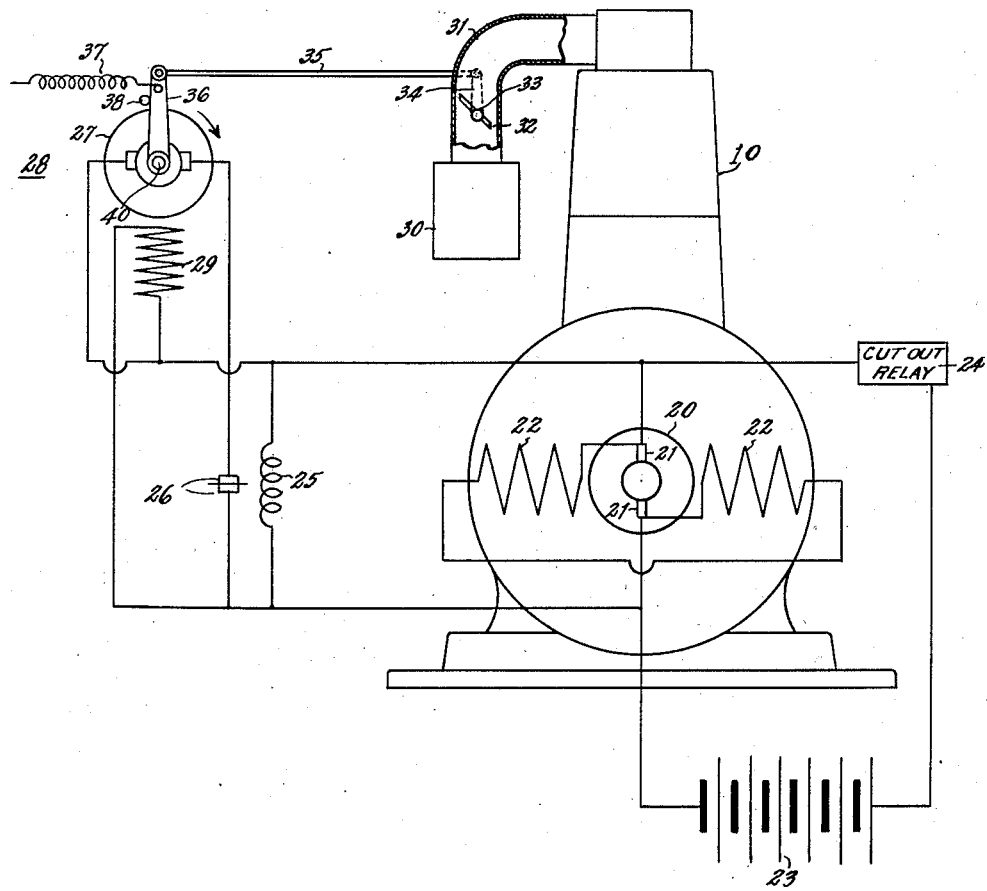
Inventor
Wilbur L. Carlson
by Spencer Hardman & Fehr
his attorneys.

Patented Mar. 23, 1943

2,314,687

UNITED STATES PATENT OFFICE 2,314,687

BATTERY CHARGING SYSTEM

Wilbur L. Carlson, Rochester, N. Y., assignor to General Motors Corporation, Detroit, Mich., a corporation of Delaware Application June 8, 1942, Serial No. 446,253

3 Claims. (Cl. 290—50)

This invention relates to apparatus for regulating the voltage of a generator driven by a stationary engine as distinguished from a vehicle propelling engine, and more particularly to the regulation of a stationary-engine-driven-generator for charging a storage battery.

It is an object of the invention to obtain an accurate control of the voltage of the generator by a control of the engine speed. To accomplish this object, I provide a torque-motor having its armature connected across the generator armature and operable to open the engine throttle valve against the action of a spring tending to close the valve. The circuit of the armature of the torque-motor is controlled by a switch which opens in response to the attainment of a predetermined generator voltage to render the torque motor ineffective to hold the throttle valve open against the action of the spring which closes it. In this way the present invention provides for a reduction of engine speed from the time when the storage battery nears its fully charged condition; and therefore, a more accurate control of the voltage of the generator is obtained than has been possible heretofore.

Further objects and advantages of the present invention will be apparent from the following description, reference being had to the accompanying drawing wherein a preferred embodiment of the present invention is clearly shown.

In the drawing:

The figure of the drawing is a wiring diagram illustrating an embodiment of the present invention.

The engine 10 drives a generator 20 having brushes 21 connected with the following circuits in parallel: (1) generator shunt field windings 22, (2) storage battery 23 and cut-out relay 24, (3) voltage regulator coil 25, (4) voltage regulator contacts 26 (normally closed) and armature 27 of a throttle governing motor 28, (5) shunt field winding 29 of motor 28.

Fuel mixture passes from a carburetor 30 to the engine 20 through a pipe 31 and is controlled by a throttle valve 32 on a shaft 33 operated by an arm 34 connected by a link 35 with an arm 36 connected with the shaft 40 of motor 28. A spring 39 urges arm 36 counterclockwise against a stop 38 and thus urges valve 32 to partly closed position, but allowing a valve opening sufficient for part load operation of the engine 20.

Assuming for example that the storage battery 23 is a 12-volt battery and that when it is fully charged, the voltage of the generator should not exceed 14.75 volts. At 14.25 volts, the voltage regulator starts to vibrate and at 14.75 volts, the contacts 26 of the vibrator remain open. The tension of spring 37 is such that motor 28 will not open the throttle valve wide open until the generator voltage is 14.25 volts. If battery 23 is only partially charged, the generator voltage will be less than 14.25 volts. Vibrating contacts 26 of the voltage regulator remain closed and motor 28 operates to open the throttle 32 to whatever position is required for the engine to develop the power required for meeting the generator load.

When the generator attains full speed, producing a generator voltage of about 14.25 volts, the motor 28 will have moved throttle 32 to wide-open position against the tension of spring 37. When the voltage exceeds 14.25 volts, the contacts 26 of the voltage regulator separate to reduce the current impressed on the motor 28 thereby permitting the spring 37 to move the throttle 32 toward closed position whereupon the engine speed and generator voltage will decrease. Contacts 26 will close again and motor 28 will again operate to open the throttle 32 and engine speed and generator voltage will increase again. When the generator voltage again exceeds 14.25 volts, the cycle will be repeated. Thus a vibratory voltage regulator operates to withhold current from the armature 27 of the throttle governing motor 28 and to permit a spring to close the throttle. If the voltage should rise to 14.75 volts, the contacts of the regulator will remain open; and the throttle will return to partially closed position.

If a voltage regulator were used alone to reduce generator shunt field excitation when a certain voltage is exceeded, the reduction of field excitation in the attempt to reduce voltage would cause the engine load to be reduced and therefore the engine would start to overspeed. To prevent this electric throttle governors of the torque motor type have been used. Heretofore the torque motor has been connected directly across the generator armature; and the torque motor has been used to close the throttle in opposition to a spring which tends to open the throttle. The torque of the motor being approximately proportional to voltage from zero to maximum, if it is desired to start regulating at 14.25 volts, it would be necessary to have the torque opposing spring loaded to restrain torque up to the torque developed at 14.25 volts. In order that the throttle might close at 14.75 volts, the rate of this spring would need to be very low. A spring which gives such performance is unknown.

The present invention provides for a reduction of engine speed from the time when the battery nears its fully charged state and therefore a more accurate control of the voltage of an engine driven generator is obtained.

While the embodiment of the present invention as herein disclosed, constitutes a preferred form, it is to be understood that other forms might be adopted, all coming within the scope of the claims which follow.

What is claimed is as follows:

1. A battery charging system comprising an engine having a fuel intake and a throttle valve for controlling the intake, a generator driven by the engine, a storage battery charged by the generator, a spring tending to close the throttle valve, means responsive to generator voltage tending to open the throttle valve, and means responsive to the attainment of a predetermined voltage for rendering ineffective the means tending to open the throttle valve.

2. A battery charging system comprising an engine having a fuel intake and a throttle valve for controlling the intake, a generator driven by the engine, a storage battery charged by the generator, a spring tending to close the throttle valve, means responsive to generator voltage tending to open the throttle valve, and a vibratory switch responsive to the attainment of a predetermined voltage for intermittently rendering ineffective the means tending to open the throttle valve.

3. A battery charging system comprising an engine having a fuel intake and a throttle valve for controlling the intake, a generator driven by the engine, a storage battery charged by the generator, a spring tending to close the throttle valve, a torque motor electrically connected with the generator and having a mechanical connection with the throttle valve and operating to open the throttle valve as the generator voltage increases, and a vibratory circuit breaker responsive to the attainment of a predetermined voltage for intermittently rendering the torque motor ineffective.

WILBUR L. CARLSON.